United States Patent Office 3,206,419
Patented Sept. 14, 1965

3,206,419
DISPERSION OF CARBON BLACK IN POLYOLEFINS
James E. Pritchard and Archie L. Robbins, Bartlesville, Okla., assignors to Phillips Petroleum Company, a corporation of Delaware
No Drawing. Filed July 22, 1960, Ser. No. 44,515
10 Claims. (Cl. 260—23)

This invention relates to the dispersion of pigments in polyolefins. In accordance with one aspect, this invention relates to a process for dispersing carbon black of a small particle size, and other finely-divided difficultly dispersible pigments, in polyolefins, especially polymers of ethylene. In accordance with another aspect, this invention relates to uniformly pigmented polyolefin compositions.

The incorporation of carbon black in solid polymers of 1-olefins, such as polyethylene ad polypropylene, has long been known and various procedures have been proposed for the production of olefin polymer-carbon black compositions. In many of these operations large amounts of black, generally greater than 25 percent and frequently as high as 50 percent based on the polymer, have been added as a filler, contributing increased hardness, stiffness, and heat distortion values.

For numerous applications of olefin polymers, black stocks containing five percent or less of carbon black are used. Loading at these levels provides effective protection against degradation from exposure to actinic light, prevents oxidation, and imparts color to the polymer. In the production of these compositions, numerous problems have been encountered in obtaining uniform dispersion of the black in the polymer, there being a tendency for the formation of agglomerates or clumps of undispersed pigment which are difficult or impossible to break up. Such agglomerates form points of weakness leading to failure of fabricated articles in which they occur.

One method which has been employed for incorporating low levels of black in olefin polymers is that of preparing a masterbatch of fairly high black content, say 20 or 30 percent based on the polymer, by Banbury blending or a similar mixing technique and blending this with further amounts of polymer until the desired black level is obtained. While this technique is an improvement over direct blending of black with polymer at the desired level, the results are frequently far from satisfactory.

The present invention relates to an improved process for uniformly dispersing pigments, such as carbon black, in polyolefins, especially polymers of ethylene, and to the compositions so produced.

Accordingly, an object of this invention is to provide for the production of uniformly pigmented polyolefins.

Another object of this invention is to provide a process for producing colored polymers of 1-olefins.

Another object of this invention is to provide new pigmented polyolefins.

Another object of this invention is to provide a pigmented polymer of ethylene composition in which the pigment particles are very finely divided and uniformly dispersed and in which there are no large pigment agglomerates.

Another object is to provide a practical and economical method for dispersing finely divided and difficultly dispersible pigments throughout polyolefins, especially polymers of ethylene, so as to obtain a high grade dispersion substantially free from pigment agglomerates.

Other objects, aspects as well as the several advantages will become apparent upon a study of the disclosure and the appended claims.

In accordance with the present invention, we have now discovered the pigments, such as carbon black, can be readily incorporated into solid polymers of 1-olefins, especially polymers of ethylene, to provide a fine and even dispersion of the pigment in the polymer by first preparing a pigment-containing paste formed by grinding the pigment in a polar material incompatible with the polymer until a uniform dispersion of the pigment in the polar material is obtained, and then blending or mixing the paste thus formed with the polymer until a uniform dispersion is obtained.

The invention further comprises a uniformly pigmented solid polymeric composition of improved properties comprising (1) a solid polymer of a 1-olefin, especially in polymer of ethylene, (2) about 0.1 to about 5 weight percent of a pigment, such as carbon black, uniformly dispersed throughout said polymer, and (3) about 0.15 to about 12 weight percent of a polar material incompatible with said polymer as a dispersing agent, each based on total weight of blend.

The pastes employed in the process of the present invention are prepared by mixing the pigment, such as carbon black, with a polar dispersant material that is incompatible with polymer. This is preferably done in an apparatus which provides a grinding action, for example, a 3-roll paint mill, a pigment mill, and ink mill, a ball mill, or a homogenizer or other similar device to provide a smooth paste. The uniform dispersion of pigment in the polar dispersant material substantially prevents agglomeration in the later step of mixing with the polyolefin by inhibiting mechanical aggregation.

The amount of pigment, such as carbon black, dispersed in the paste preparation generally will be in the range from about 10 to about 35 weight percent, preferably from about 15 to about 35 weight percent. The grinding step of dispersing the pigment in the polar dispersant will ordinarily be conducted at room temperature although in some instances, particularly when operating with polar dispersant materials which are low melting solids, higher temperatures can be used.

The pigments employed in the present invention can be any well known pigments ordinarily blended with polymers. However, carbon black is preferred. The carbon black employed can be of any type including both channel and furnace black, lamp black and the like. Although the invention is discussed mainly in terms of carbon black, the teachings of the invention obviously can be practiced with advantage to the incorporation of other prime reinforcing and extender pigments. Other pigments which are obtained as insoluble particulate solids such as zinc oxide, titanium dioxide, lithopone, clays, hydrated alumina, precipitated calcium carbonates, and the like, can be used instead of carbon black when desired.

The polar dispersants are materials which are incompatible with the polymer, i.e., have no solubilizing or swelling effect thereon, and are non-volatile liquids at the temperature at which the paste is milled into the polymer, generally in the range from about 275 to about 700° F. The polar dispersant materials of the invention that are incompatible with the polyolefins are further characterized in that these materials are soluble in water and essentially insoluble in hydrocarbons, such as cyclohexane. Examples of such materials include monohydric and polyhydric alcohols such as lauryl alcohol, decyl alcohol, 1,4-butane diol, the butylene glycols, glycerol, erythritol, and the like; ether alcohols such as the polyethylene glycols, methy Carbitol and the like; sulfonated high molecular weight fatty acids such as sulfonated linoleic acid, sulfonated castor oil (Turkey-red oil), and the like; esters and polyesters which have free hydroxyl groups or carboxyl groups such as ethylene glycol dioxalate, ethylene glycol dimaleate, the diester of maleic acid with ethylene glycol, and the like.

In another aspect of this invention, the pigment-containing paste is prepared in stages by first grinding the pigment with a monohydric or polyhydric alcohol to form a paste, mixing the paste with a monobasic or polybasic acid (preferably as the anhydride and the mixture thus obtained stirred and heated to induce reaction between the alcohol and the acid. By so operating, reaction of the alcohol with the acid leads to formation of an ester which coats the pigment particles. In this embodiment of the invention the boiling point limits of the alcohols and acids are lowered since this limitation is established to avoid volatilization of the dispersing agent in the milling step in which the pigment-containing paste is incorporated in the polymer. In this embodiment, the limitation to materials boiling above the milling temperature is applicable to the ester or polyester formed.

When using this procedure, suitable polyhydric alcohols include, in addition to those previously mentioned, compounds such as ethylene glycol and propylene glycol. Monohydric alcohols containing from one to 16 carbon atoms such as methanol, ethanol, propanol, butanol, octanol, decanol, dodecanol, tetradecanol, hexadecanol, and the like, can also be used, the grinding step being conducted at a temperature at which the alcohol is in the liquid state.

Ether alcohols as previously listed are likewise applicable. In general, monobasic acids containing from 2 to 16 carbon atoms and polybasic acids containing from 3 to 10 carbon atoms, each preferably as the anhydrides, can be employed. Examples of monobasic acids applicable include acetic, propionic, butyric, valeric, caprylic, capric, palmitic, stearic, and the like; examples of polybasic acids include malonic, succinic, glutaric, adipic, pimelic, suberic, azelaic, sebacic, maleic, fumaric, and the like. While esterification can be effected by simple heating in the range between about 170 and 440° F., it is frequently desirable to add a small amount of a mineral acid such as hydrochloric acid, sulfuric acid, or the like, to catalyze the reaction.

The second step of the process comprises incorporating the paste described above into the polymer. The paste is incorporated into the polymer in amounts such that the amount of pigment is in the required range, preferably between 0.1 and about 5 weight percent. In carrying out this step of the invention, it is preferred that the paste and polymer be subjected to a thorough mechanical working. Various apparatuses adapted for mechanical working of mixtures are known such as the Banbury mixer, color mixing type screw, ink rolls, roll mill or similar devices. The temperature of the stock in the second step of the process preferably is above the softening temperature of the polymer, but below the decomposition temperature of the materials. Generally, the paste is milled into the polymer at a temperature ranging from about 275 to about 700° F. As indicated above, the amount of pigment in the final polymer composition generally ranges from about 0.1 to about 5 weight percent; however, higher loadings of pigments in the polymer can be accomplished by the invention.

The olefin polymers used in the present invention include polymers and copolymers of 1-olefins having a maximum of 8 carbon atoms per molecule and no branching nearer the double bond that the 4-position such as polyethylene, polypropylene, poly-1-butene, ethylenebutene copolymers and the like. The polyolefins or 1-olefin polymers that can be pigmented by the practice of the present invention can be prepared by any of the well known methods which are usually employed in the prepartion of these polymers. One method of preparing preparation of these polymers. One method of preparing lymerization described in the Hogan et al. patent U.S. 2,825,721 (1958). The polyolefins prepared by the Hogan et al. method are characterized by their high density. Polymers of ethylene, including homopolymers and copolymers, prepared by this method generally have a density ranging from 0.920 to 0.990, ordinarily 0.930 to 0.970.

In addition to the foregoing method of preparing the 1-olefin polymers, especially polymers of ethylene, the invention also includes within its scope the pigmentation of polyolefins prepared by polymerization in the presence of an organometal catalyst such as trialkylaluminum in conjunction with a titanium halide, or in polyolefins prepared by the high pressure polymerization processes which employ oxygen, peroxide, or other oxygen carrier as a catalyst.

The pigmented compositions of this invention can have widely different uses. For example, compositions containing a carbon black have been found to have greatly improved resistance to ultraviolet light and the effects of outdoor weathering when compared with unpigmented polyolefins or polyolefin compositions containing carbon black poorly dispersed therein. Also, points of weakness in molded items caused by agglomeration of pigment are eliminated. Polyolefin compositions containing the finely divided pigments other than carbon black are useful in the fabrication of molded or extruded articles where attractive coloration is desired and can be fabricated by conventional methods into sheets, rods, tubes, films, and the like.

It has been found that when operating according to the present invention, the time required for effecting adequate dispersion of the pigment is greatly reduced from that required by methods of the prior art. A surprising and unexpected aspect of the present invention lies in the discovery that dispersants incompatible with the polymer serve effectively to provide a finely divided, homogeneous dispersion of pigment while compatible materials such as mineral oil, salad oil, linseed oil, and the like lead to agglomeration and non-homogeneous dispersions similar to or even less desirable than when operating according to conventional dilution techniques.

A further unexpected feature of the invention lies in the apparent absence of bleeding or blooming of the dispersant from the pigmented stocks as well as in the lack of deterioration in the physical properties thereof. Flexural modulus, Shore hardness, tensile values and stress cracking resistance show no adverse effect from the presence of residual dispersant materials in the pigmented polymers.

In many instances the residual dispersant materials act as processing aids, facilitating milling, extrusion and similar operations involved in fabricating or finishing operations.

The following examples are given to better illustrate the invention.

EVALUATION PROCEDURE

For evaluation of the dispersions of carbon black in an olefin polymer, a small specimen approximately 5.0 x 5.0 x 0.5 mm. was cut from the polymer with a razor blade and positioned near the middle of a standard glass microscope slide. A second slide was placed over the specimen after which the assembly was placed on a hot plate under an 800 gram weight. The slide assembly was heated until the polymer was melted and pressed out between the slides to provide a layer approximately 0.5 mil in thickness. This slide was then examined under 50× magnification by transmitted light. Rating was made according to Bell Laboratories standards as follows:

A=Fine homogeneous dispersion with no significant agglomerates.
B=Good but a very few small agglomerates.
C=Fair, several small agglomerates.
D=Unacceptable, large agglomerates.

*Example I*

A smooth paste was prepared by mixing 30 weight parts of Monarch 74 carbon black, a fine pigment type channel black, in 70 weight parts of sulfonated castor oil (Turkey-red oil) and passing the mixture through a three-roll Kent pigment mill. A portion of this paste was mixed with polyethylene in a ratio of 10 parts paste to 90 parts polymer to provide a product containing three percent black, mixing being on a roll mill at 300° F. for four minutes. The polyethylene was prepared according to the method of Hogan et al., supra, and had density of 0.960 and a melt index of 0.9.

To provide controls, a 20 percent masterbatch was made of Monarch 74 carbon black in a polyethylene having the same properties as that described in the preceding paragraph by mixing on a roll mill at 300° F. for 20 minutes. Two blends of 15 parts of this masterbatch with 85 parts polyethylene were prepared by mixing on a roll mill at 300° F., one for four minutes, the other for 30 minutes. These controls are designated as "conventional" in the tabulation below.

Slides were prepared from each of these compositions and evaluated against the Bell Laboratories standards with the following results:

Turkey-red oil, 4 min. blend _____ B+
Conventional, 4 min. blend _____ D
Conventional, 30 min. blend _____ C−

*Example II*

A series of tests was made in which various dispersants were used to demonstrate the effect of the type of dispersant on the dispersion obtained. In these tests, pastes were prepared by mixing 30 parts of black (Monarch 74) in 70 parts dispersant and passing through a three-roll pigment mill. Examination of the pastes microscopically showed satisfactory dispersion of the black. Each dispersion was blended with a polyethylene having the same properties as in Example I on a roll mill at 300° F. for 30 minutes to provide three percent black in the polymer. Slides were prepared and the products evaluated microscopically. Data from these tests are shown below:

| Non-polar Solvent | Polar Solvent | Dispersion Rating |
|---|---|---|
| Mineral Oil | | D |
| Wesson Salad Oil | | D |
| Linseed Oil | | D |
| Liquid butadiene polymer | | D |
| | Glycerol | B− |
| | Polyethylene glycol [1] | B |
| | Turkey-red Oil | B+ |

[1] Carbowax 200.

The polar solvents in the above table were found to be soluble in water and insoluble in cyclohexane, whereas the non-polar solvents were found to be insoluble in water and soluble in cyclohexane.

*Example III*

Blends of polyethylene having the same properties as in the preceding examples containing three percent black (Monarch 74) were prepared in the manner described above using glycerol and Turkey-red oil as dispersants, the blends being prepared by roll milling at 300° F. for 30 minutes. The products were evaluated to determine their physical properties, a non-black containing sample of the same polymer being used as a control. Data from these tests are shown below.

| Oil | Turkey-red Oil | Glycerol | Control |
|---|---|---|---|
| Flexural Modulus, p.s.i. | 227,000 | 268,000 | 230,000 |
| Hardness, Shore D | 70 | 71 | 68 |
| Tensile (yield), p.s.i. | 4,280 | 4,784 | 4,400 |
| Elongation (break), percent | 16 | 11 | 30 |
| ESC ($F_{50}$), hr.[1] | 15 | 18 | 14 |
| TSC ($F_{50}$), hr.[2] | <1 | <1 | <1 |
| Bleeding (Room temp., 3 wks.) | None | None | None |
| Bleeding (100° C., 1 wk.) | None | | None |

[1] Environmental stress cracking, time to 50% failure.
[2] Thermal stress cracking, time to 50% failure.

This example shows that physical properties of the polyethylene are substantially unchanged by this treatment in accordance with the invention.

*Example IV*

A test was made in which a 30 percent mixture of black was made in Turkey-red oil by stirring, the pigment milling step being omitted. This was blended with a polyethylene having the same properties as in previous examples on a roll mill at 300° F. for 30 minutes to provide a three percent mixture. Evaluation of this product was C+, showing some improvement over the conventional procedure (as defined in Example I) but considerably poorer than when the paste was subjected to treatment in a pigment mill.

*Example V*

A paste of 40 percent in Turkey-red oil was prepared by mixing the ingredients and grinding in a pigment mill. This paste was "let down" in a polyethylene having the same properties as in previous examples to provide a three percent loading, blending being done on a roll mill at 300° F. for 30 minutes. Microscopic examination of the product gave a value of D, thus demonstrating that the 40 percent paste had an undesirably high level of black.

*Example VI*

A paste was prepared of 30 percent black in ethylene glycol using the pigment mill as described above. To this paste was added maleic anhydride in an equimolar amount, with stirring. The mixture was heated at 90° C. for one hour and at 195° C. for about three hours. This paste was then blended with a polyethylene having the same properties as in previous examples in an amount sufficient to provide a three percent black loading, mixing being done on a roll mill at 300° F. for 15 minutes. Evaluation of the blend was rated as A based on the black dispersion.

In density determinations the specimens are prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density was determined by placing a smooth, void-free pea-sized specimen cut from a compression molded slab of the polymer in a 50 ml. glass-stoppered graduate. Carbon tetrachloride and methyl cyclohexane were added to the graduate from burettes in proportion such that the specimen was suspended in the solution. During the addition of the liquids the graduate was shaken to secure thorough mixing. When the mixture just suspended the specimen, a portion of the liquid was transferred to a small test tube and placed on the platform of a Westphal balance and the glass bob lowered therein. With the temperature shown by the thermometer in the bob in the range 73–78° F., the balance was adjusted until the pointer was at zero. The value shown on the scale was taken as the specific gravity. With the balance standardized to read 1.000 with a sample of distilled water at 4° C. the specific gravity will be numerically equal to density in grams per cc.

The composition of this invention comprises the polyolefin, the polar dispersant material incompatible with the polyolefin, and the pigment; however, small amounts of other materials are not excluded. Such materials include antioxidants, stabilizers, lubricants, antistatic agents and the like, but these will only be used in small amounts to improve certain properties of the composition other than the degree of pigment dispersion. Also it is within the scope of the invention to use mixtures of two or more pigments for dispersion in the polyolefin and this is an advantage in some instances where it is desired to match a certain color, by blending and uniformly dispersing two pigments of different colors or shades.

While this invention has been described and illustrated by the examples shown, it is not intended to be strictly limited thereto, and other modifications and variations can be employed within the scope of the following claims.

We claim:

1. A solid polymeric composition comprising a solid polyolefin formed by polymerizing at least one 1-olefin having from 2 to 8 carbon atoms per molecule and having uniformly dispersed therein (1) from about 0.1 to about 5 weight percent finely divided carbon black and (2) from about 0.15 to about 12 weight percent of at least one polar material selected from the group consisting of monohydric and polyhydric alcohols, ether alcohols, sulfonated high molecular weight fatty acids, and esters and polyesters having free hydroxyl groups and carboxyl groups, said polar materials being incompatible with said polyolefin and being further characterized as materials soluble in water and essentially insoluble in hydrocarbons and non-volatile at the temperature at which the carbon black and polar material are incorporated into said polyolefin.

2. A solid polymeric composition comprising a solid polyethylene having uniformly dispersed therein (1) from about 0.1 to about 5 weight percent finely divided carbon black and (2) from about 0.15 to about 12 weight percent of at least one polar material selected from the group consisting of monohydric and polyhydric alcohols, ether alcohols, sulfonated high molecular weight fatty acids, and esters and polyesters having free hydroxyl groups and carboxyl groups, said polar materials being incompatible with said polyethylene and being further characterized as material soluble in water and essentially insoluble in hydrocarbons and non-volatile at the temperature at which the carbon black and polar material are incorporated into said polyethylene.

3. A composition according to claim 1 wherein said polar material is glycerol.

4. A composition according to claim 1 wherein said polar material is polyethylene glycol.

5. A composition according to claim 1 wherein said polar material is Turkey-red oil.

6. A composition according to claim 1 wherein said polar material is formed by admixing ethylene glycol with maleic anhydride.

7. A process for uniformly dispersing finely divided carbon black in a solid polyolefin, said polyolefin being formed by polymerizing 1-olefins of 2-8 carbon atoms, which comprises the steps:

grinding carbon black with a polar material soluble in water and essentially insoluble in hydrocarbons and incompatible with said polymer in amounts sufficient to form a paste containing from 10–35 weight percent of said carbon black.

mixing said paste with said polyolefin in amounts sufficient to form a blend containing from 0.1 to 5 weight percent of carbon black and 0.15 to 12 weight percent polar material, and mechanically working the blend thus formed at a temperature above the softening temperature of said polyolefin until a uniform dispersion of carbon black and polar material in said polyolefin is obtained.

8. A process for uniformly pigmenting a polyolefin with carbon black, said polyolefin being formed by polymerizing 1-olefins of 2–8 carbon atoms, which process comprises the steps:

grinding a finely divided carbon black with an alcohol selected from monohydric and polyhydric alcohols containing up to and including 16 carbon atoms until a uniform dispersion containing from 10 to 35 weight percent of said carbon black is obtained, mixing the carbon black dispersion thus obtained with an acid selected from monobasic acids having from 2–16 carbon atoms and polybasic acids containing from 3–10 carbon atoms, heating the carbon black dispersion containing said acid to react said acid with said alcohol to form a paste comprising said carbon black dispersed in an ester, mechanically working the paste dispersion thus obtained with said polyolefin at a temperature above its softening temperature until a uniformly pigmented polyolefin composition containing from 0.1 to about 5 weight percent carbon black is obtained, and recovering said carbon black pigmented polyolefin as a product of the process.

9. A process for producing a substantially agglomerate-free dispersion of carbon black in a polyolefin, said polyolefin being formed by polymerizing 1-olefins of 2–8 carbon atoms, which comprises the steps:

forming a paste containing from 10 to 35 weight percent of carbon black uniformly dispersed in a polar material incompatible with said polyolefin, said polar material being soluble in water and essentially insoluble in hydrocarbons and being selected from monohydric and polyhydric alcohols, ether alcohols, sulfonated high molecular weight fatty acids and esters and polyesters having free hydroxyl groups and carboxyl groups, and thereafter mixing the paste thus formed with said polyolefin until a uniformly pigmented polyolefin composition containing from 0.1 to about 5 weight percent carbon black is obtained.

10. A method for uniformly pigmenting a polyolefin with carbon black, said polyolefin being formed by polymerizing 1-olefins of 2–8 carbon atoms, which comprises:

mixing together finely divided carbon black and a polar material incompatible with said polyolefin, said polar material being soluble in water and essentially insoluble in hydrocarbons and being selected from monohydric and polyhydric alcohols, ether alcohols, sulfonated high molecular weight fatty acids, and esters and polyesters having free hydroxyl groups and carboxyl groups, the amount of carbon black and polar material mixed being sufficient to form a mixture containing from 10 to 35 percent by weight carbon black, grinding the mixture thus formed until a paste having carbon black uniformly dispersed therein is obtained, mechanically working the carbon black dispersion in said polar material with said polyolefin at a temperature ranging from about 275 to about 700° F. until said carbon black is uniformly dispersed in said polyolefin, the amount of carbon black dispersion mixed with polyolefin being sufficient to form a final dispersion containing from 0.1 to 5 weight percent carbon black, and recovering said uniformly pigmented polyolefin as a product of the process.

References Cited by the Examiner

UNITED STATES PATENTS

| | | | |
|---|---|---|---|
| 2,065,762 | 12/36 | Stanley | 260—37 |
| 2,525,691 | 10/50 | Lee et al. | 260—31.4 |
| 2,561,010 | 7/51 | Carson | 260—31.8 |
| 2,683,668 | 7/54 | Godshalk | 260—37 |
| 2,758,984 | 8/56 | Coler | 260—23 |
| 2,830,943 | 4/58 | MacKenzie | 260—37 |
| 2,838,437 | 6/58 | Froemming et al. | 260—31.8 |
| 2,870,113 | 1/59 | Jones | 260—34.2 |
| 2,980,964 | 4/61 | Dilke | 260—33.2 |
| 3,017,238 | 1/62 | Levine et al. | 260—23 |
| 3,076,776 | 2/63 | Findlay | 260—33.4 |
| 3,127,368 | 3/64 | Thomson | 260—41 |

FOREIGN PATENTS

| | | |
|---|---|---|
| 1,164,934 | 5/58 | France. |
| 569,170 | 5/45 | Great Britain. |

OTHER REFERENCES

Fischer: "Surface Active Agents in Printing Ink," American Ink Maker, April 1943, pages 19–23 and 45.

LEON J. BERCOVITZ, *Primary Examiner.*

ALPHONSO D. SULLIVAN, MILTON STERMAN,
*Examiners.*